W. A. DUNCAN.
KITCHEN CABINET.
APPLICATION FILED NOV. 27, 1920.

1,400,145.

Patented Dec. 13, 1921.
5 SHEETS—SHEET 2.

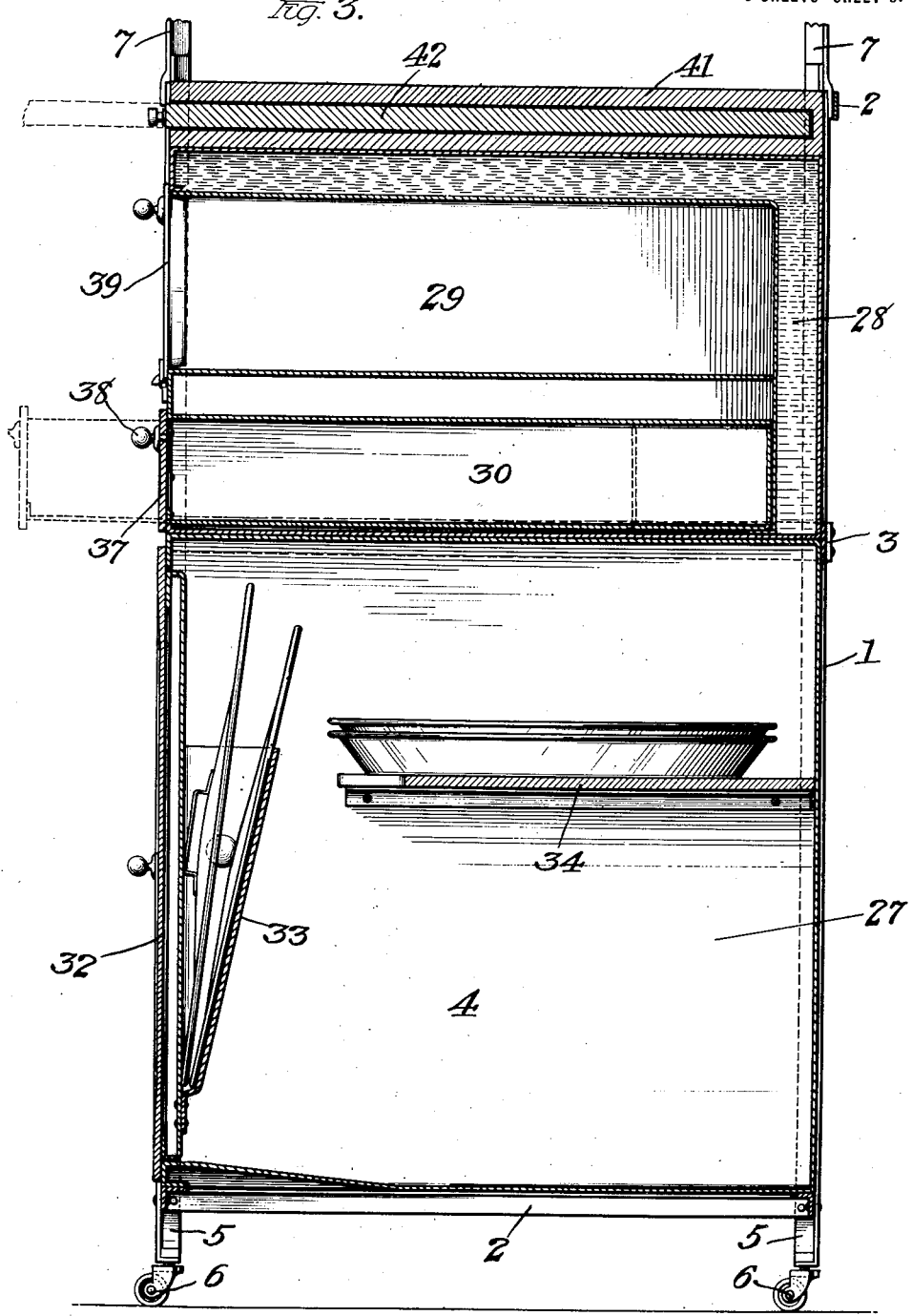

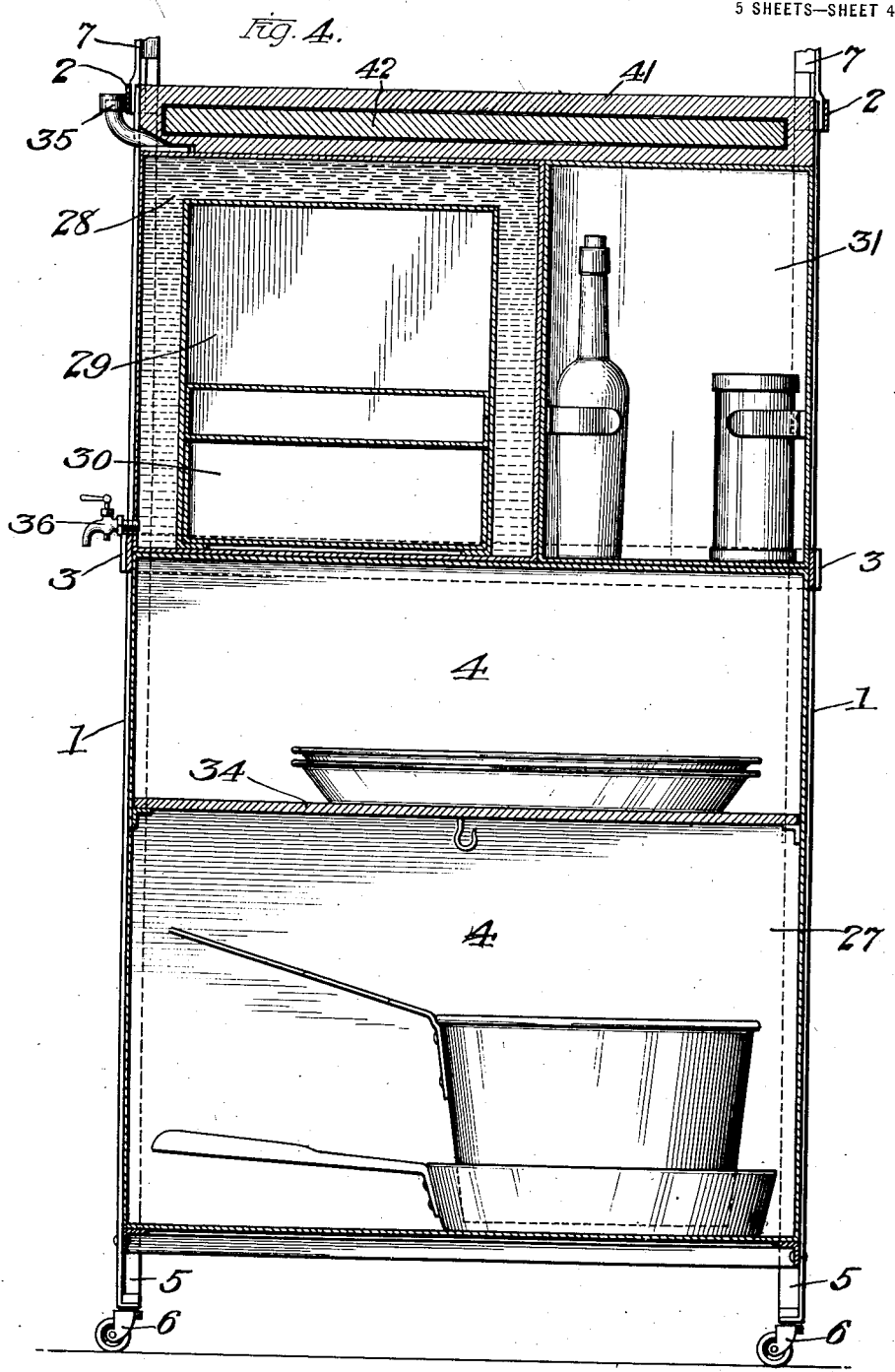

W. A. DUNCAN.
KITCHEN CABINET.
APPLICATION FILED NOV. 27, 1920.
1,400,145.
Patented Dec. 13, 1921.
5 SHEETS—SHEET 5.
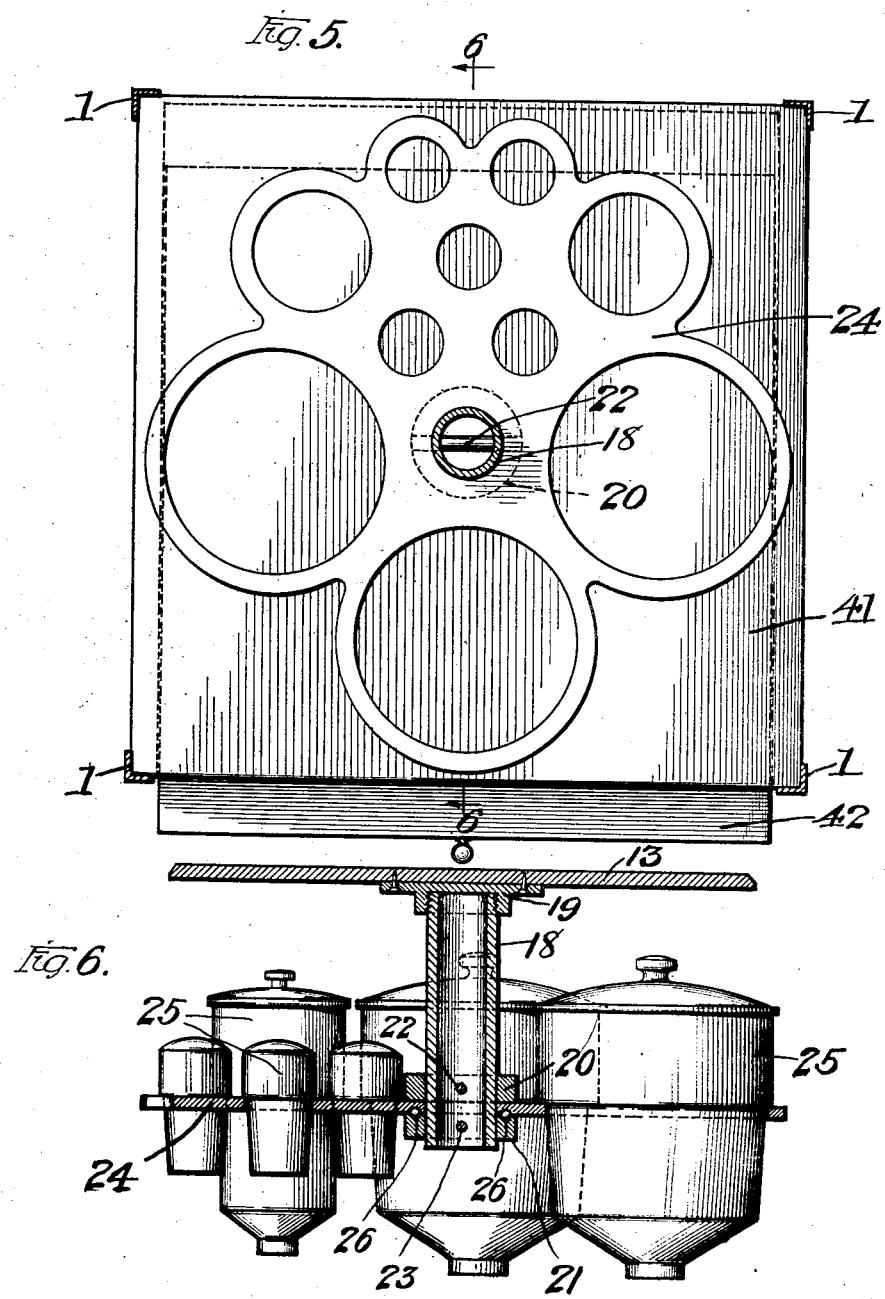

UNITED STATES PATENT OFFICE.

WAYNE A. DUNCAN, OF CHICAGO, ILLINOIS.

KITCHEN-CABINET.

1,400,145.  Specification of Letters Patent.  Patented Dec. 13, 1921.

Application filed November 27, 1920. Serial No. 426,695.

*To all whom it may concern:*

Be it known that I, WAYNE A. DUNCAN, a citizen of the United States, residing at Chicago, Illinois, have invented certain new and useful Improvements in Kitchen-Cabinets; and I do hereby declare the following to be a full, clear, and exact description of the invention, such as will enable others skilled in the art to which it appertains to make and use the same.

This invention relates to kitchen cabinets, and particularly to a portable device of this character, designed for use primarily in apartments where the space is more or less limited or restricted.

The principal object of the invention is to provide a cabinet of this type, convenient for use in either a kitchenette or a larger kitchen, said cabinet adapted to be moved with ease so that the same will be available either at the stove, table, or any other place where the same is adapted to be used.

Another object of the invention is the provision of a cabinet so designed that when the same is not in use it may readily be stored in a closet, pantry or the like, providing a convenient means of disposing of the cabinet at such times.

The usual kitchen cabinet is not adapted to the portable and restricted space requirements that many light-housekeeping conditions make desirable. The combination herein disclosed has been devised to meet this want and to provide, in one assembly, a compact and easily portable kitchen equipment, adapted to a comprehensive range of light-housekeeping uses, yet at the same time capable of containing within certain limits substantially all of the necessary utensils of the culinary art.

The cabinet also contemplates the provision of separate compartments for various food stuffs and condiments, including a water-cooler chamber and refrigerator compartments.

Briefly stated, the invention comprises a kitchen cabinet having a rectangular shaped base portion, vertically arranged and supported upon rollers or similar casters, said base portion being transversely subdivided into upper and lower compartments, the lower or larger compartment provided with the necessary shelving for containing the various pots and pans and similar cooking utensils. The upper compartment of said lower portion is subdivided into a water-tight chamber surrounding refrigerator compartments, said water-tight chamber adapted to receive cracked ice and water for cooling said refrigerator compartments and at the same time furnish the moisture necessary for supplies in said refrigerator compartments. Adjoining the ice and water chamber is another cooling compartment which may be used for the storage of various food stuffs and liquids required to be kept under such conditions.

Mounted upon the base portion of the cabinet by suitable vertically arranged standards is a canister or cylindrical bin for containing, preferably, flour. This bin is so mounted that the same may be lowered for filling and again elevated in operative position, appropriate means, to be hereinafter more fully described, being provided for these various manipulations. Rotatably supported between the flour bin and the base portion of the cabinet is a caster arrangement adapted to support the jars or similar containers of various shapes and sizes provided for the reception and dispensing therefrom of the various and sundry condiments and similar groceries and supplies.

The preferred form of the invention is illustrated in the accompanying drawings, in which—

Fig. 3 is a vertical sectional view of the base portion of the cabinet on line 3—3 of Fig. 1.

Fig. 4 is a like sectional view on line 4—4 of Fig. 2.

Fig. 5 is an enlarged plan view of the caster arrangement with the various containers removed, and Fig. 6 is a view, partly in elevation and partly in section, on line 6—6 of Fig. 5, illustrating the details of the caster arrangement.

Figure 1:
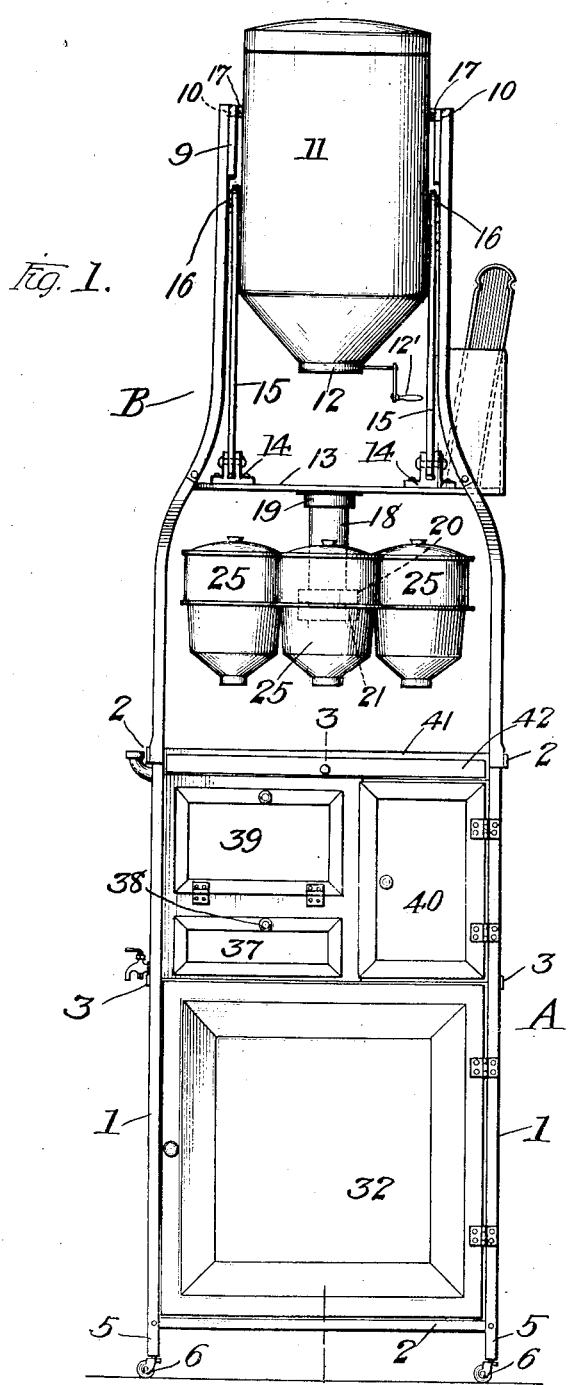
Figure 1 is a front elevation showing the general arrangement of the complete cabinet.

Referring to the drawings in detail, the improved cabinet comprises a base portion A, provided with a superstructure or upper support B.

The base portion A, which is preferably of metal, comprises a framework consisting of angular shaped corner pieces 1, upper and lower connecting cross-pieces 2, and intermediate cross-pieces or members 3. Positioned between the corner-pieces 1 and the upper and lower cross-pieces 2 are side and back plates 4, which are preferably made of sheet metal, and, taken together with the doors in the front of the cabinet, to be hereinafter more fully referred to, form a complete closure for the base portion of the cabinet.

It will be noted that the lower ends of the corner-pieces 1 extend downwardly and form the supporting legs 5 of the cabinet, said legs 5 having secured thereto the necessary rollers or casters 6.

Supported upon the lower base portion A of the cabinet, adjacent the corner pieces 1 and the upper cross pieces 2 thereof, are vertically arranged standards 7. These standards are arranged in pairs and are bent inwardly and converge at their upper ends 8, where they are secured in this position by plates 9, the upper end of said plates provided with a recess or cut-out portion 10 for the purpose to be hereinafter more fully described.

Positioned between the upper ends 8 of the standards 7 is a cylindrical bin or container 11, said container being provided with the necessary filling opening or outlet 12, having removably mounted therein the conventional flour sifter operated by a handle 12'.

Figure 2:
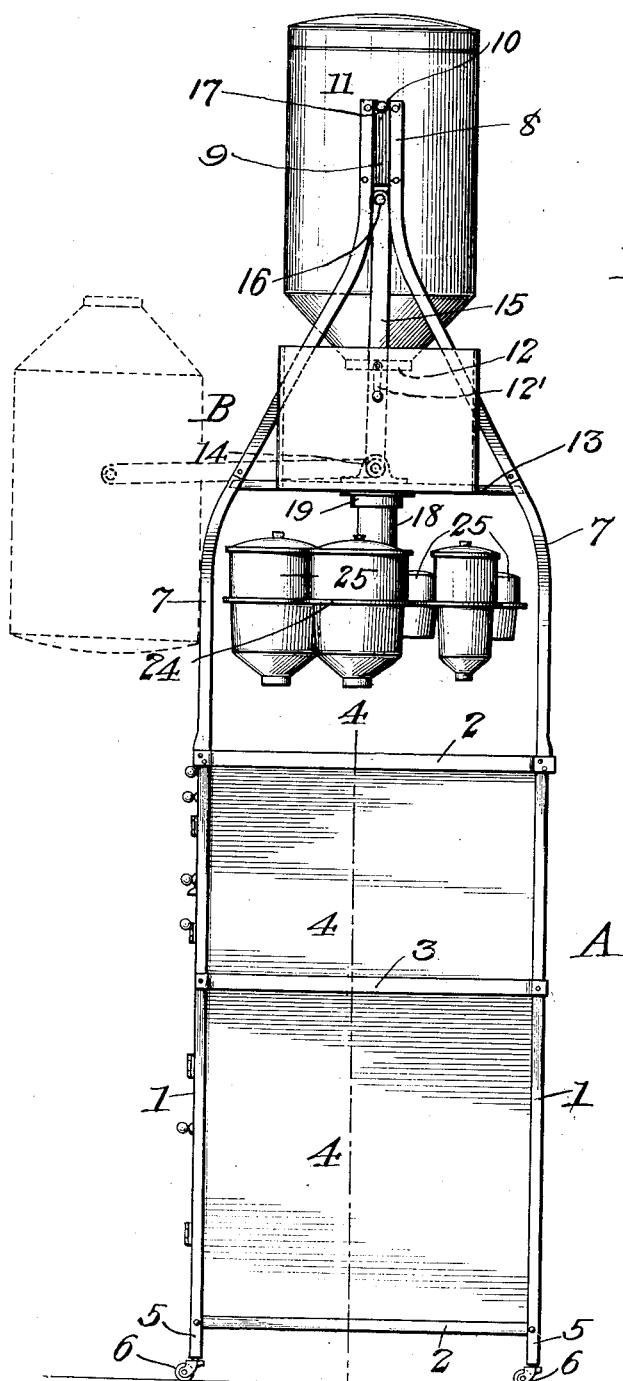
Fig. 2 is a similar view in side elevation.

Positioned about midway between the upper ends 8 of the standard 7 and the lower ends thereof is a shelf or support 13, said shelf being secured to the standards 7 in any convenient manner. Secured to the upper portion of the shelf near the side edges thereof, adjacent the vertical standard 7, are a pair of bearings or pivotal supports 14, having hingedly mounted therein a pair of links 15, the upper ends of said links being pivotally secured at diametrically opposite points 16, intermediate the upper and lower portions of the cylindrical bin, and about which the said bin is adapted to be swung or rotated as the same is being lowered or elevated to its various positions, indicated in dotted lines in Fig. 2, where it will be noted that when the bin is lowered the same will be supported in this position by the links 15 resting upon the support or shelf 13. In order to maintain the bin in its upper or elevated position, the same is provided with a pair of oppositely disposed spring-pressed buttons 17 which are adapted to snap into the recesses 10 formed in the plate 9 adjoining the upper ends 8 of the vertical standard 7.

Depending from the lower side of the shelf 13, and centrally disposed with respect thereto, is a support 18. This support is preferably hollow and at its upper end is provided with a flanged socket 19, by which means the support is secured to the shelf 13, as clearly shown in Fig. 6. Support 18 may be screw-threaded into the socket 19 or otherwise rigidly attached thereto in any similar manner. Secured to the lower end of the support 18 are a pair of spaced annular members or rings 20 and 21, and, as illustrated, the said supporting rings are secured by through pins 22 and 23, but, of course, any other improved means may be substituted.

Rotatably mounted on the support 18, and between the rings 20 and 21, is a plate 24 suitably provided with cut-out openings of different sizes to receive and support a series of vessels 25 for containing the various condiments and grocery supplies, the whole forming a very simple and effective arrangement for the purpose intended.

In order to provide for an easy rotation of said caster arrangement, the upper face of the lower supporting ring 21 and the adjacent lower face of the caster plate 24 are provided with race-ways in which are positioned a series of balls, forming a ball-bearing support for the caster, as clearly shown at 26 in Fig. 6.

The base portion A of the cabinet is transversely divided into a large lower compartment 27, and a series of upper compartments consisting of a water-cooler chamber 28, refrigerator compartments 29 and 30, and a cooling compartment 31. The large compartment 27 is provided with a door 32 forming access to the compartment from the front of the cabinet, and the back thereof is constructed with a pocketlike arrangement 33 for the reception of lids and the like for the various vessels. Within compartment 27 is arranged one or more shelves 34 for supporting the cooking pans of the smaller variety, whereas the bottom of said compartment is well adapted for the storage of the larger pots and pans.

Surrounding the refrigerator compartments 29 and 30 is a water-cooler chamber 28 which is adapted to be supplied with cracked ice and water through the filling opening 35, the said compartment near its bottom being additionally provided with a spigot 36 for the purpose of dispensing drinking water when desired. It will be noted that the compartment 30 is preferably constructed in the form of a drawer provided with the necessary front 37 and drawer-pull 38. The compartment 29 is likewise provided with a door 39, furnishing the necessary access to this compartment. Arranged alongside of the water-cooler compartment 28 is an additional cooling compartment 31, this compartment being also provided with a hinged door 40.

From the foregoing description it will be noted that all of the doors and access to the various compartments of the base portion of the cabinet are arranged on the same side and in the front portion of the cabinet.

On top of the base portion A is an extensible porcelain top 41 inclosing a sliding telescoping porcelain shelf 42, which is particularly adapted for use as a bread board. The shelf 41 may be extended carrying with it the bread board 42, or the bread board 42 may be independently extended, as desired.

From the foregoing description it will be apparent that applicant has provided a very desirable and complete kitchen cabinet adapted to contain, within certain limits, all of the necessary grocery supplies, including those of a perishable nature, necessary to a complete article of furniture of this type. In addition, the various compartments of the cabinet are so arranged as to store the necessary cooking utensils and culinary implements, all in one and the same assembly, the particular design and construction of the cabinet making the same readily portable and well adapted to be stored when not in use.

The improved kitchen cabinet herein described is preferably made of angle iron and sheet metal, forming a very strong and rigid article of furniture of the class indicated, yet at the same time comparatively light, in keeping with the adaptability and portable nature of the complete cabinet. Of course it is to be understood that applicant does not wish to be limited to a metallic structure, as the said cabinet is adapted to constructions wherein other materials may be used. It is to be further understood that the water-cooler compartment will be properly insulated from the rest of the cabinet in any improved manner as is customary, in order to retain as long as possible the cooling properties of said compartment.

What I claim is—

1. A cabinet of the class described comprising a base portion and a superstructure consisting of upwardly extending members mounted on said base portion, a support or shelf arranged intermediate the upper and lower ends of said superstructure members, a pair of pivotal links supported by said shelf, a bin pivotally attached to said links, and detachable means carried by the bin for coöperating with the upper end of the structure for maintaining said bin in its normal position.

2. A cabinet of the class described comprising a base portion and a superstructure consisting of upwardly extending members mounted on said base portion, a support or shelf arranged intermediate the upper and lower ends of said superstructure members, a pair of pivotal links supported upon the upper side of said shelf, a bin pivotally attached to said links, detachable means carried by the bin for coöperating with the upper end of the structure for maintaining said bin in its normal position, a support carrying a rotating plate comprising substantially a caster also supported by said shelf, and a series of jars or containers carried by said caster.

3. A cabinet of the class described comprising a base portion and a superstructure consisting of upwardly extending members mounted on said base portion, a support or shelf arranged intermediate the upper and lower ends of said superstructure members, a pair of pivotal links supported upon the upper side of said shelf, a bin pivotally attached to said links, detachable means carried by the bin for coöperating with the upper end of the structure for maintaining said bin in its normal position, a support carrying a rotating plate comprising substantially a caster also supported by said shelf, a series of jars or containers carried by said caster, upper and lower compartments dividing the base portion, sub-compartments inside the upper portion consisting of a food storage compartment and refrigerator compartments, and a water cooling chamber surrounding said refrigerator compartments.

4. A cabinet of the class described, comprising a base portion and a superstructure consisting of upwardly extending members mounted on said base portion, a support or shelf arranged intermediate the upper and lower ends of said superstructure members, a pair of pivotal links supported by the upper side of said shelf, a bin pivotally attached to said links, detachable means carried by the bin coöperating with the upper end of the superstructure for maintaining said bin in its normal position, a support carrying a rotating plate, comprising substantially a caster, secured to the under side of said shelf, a series of jars or containers carried by said caster, a sliding top for said base portion, a sliding shelf carried within said top, upper and lower compartments dividing the base portion, sub-compartments inside the upper compartment consisting of a food storage compartment and refrigerator compartments, and a water-cooler chamber surrounding said refrigerator compartments.

In testimony whereof I affix my signature.

WAYNE A. DUNCAN.